US009832332B2

(12) United States Patent
Sunako et al.

(10) Patent No.: US 9,832,332 B2
(45) Date of Patent: Nov. 28, 2017

(54) IMAGE READER HAVING DOCUMENT DETECTOR FOR DETECTING PRESENCE OR ABSENCE OF DOCUMENT SHEET TO DETERMINE READING RANGE

(71) Applicant: BROTHER KOGYO KABUSHIKI KAISHA, Nagoya, Aichi (JP)

(72) Inventors: Shuichi Sunako, Ichinomiya (JP); Seiya Sato, Mie-ken (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 15/399,859

(22) Filed: Jan. 6, 2017

(65) Prior Publication Data
US 2017/0208198 A1 Jul. 20, 2017

(30) Foreign Application Priority Data

Jan. 15, 2016 (JP) ................................ 2016-005879

(51) Int. Cl.
*H04N 1/04* (2006.01)
*H04N 1/00* (2006.01)
*H04N 1/10* (2006.01)

(52) U.S. Cl.
CPC ..... *H04N 1/00801* (2013.01); *H04N 1/00689* (2013.01); *H04N 1/00708* (2013.01);
(Continued)

(58) Field of Classification Search
CPC .......... G03G 15/5004; G03G 15/6532; G03G 2215/00679; G03G 2215/00721;
(Continued)

(56) References Cited

U.S. PATENT DOCUMENTS 8,149,471 B2 * 4/2012 Kawai .................... H04N 1/409
347/234
8,259,370 B2 * 9/2012 Iwatsuka .................. H04N 1/40
358/509
(Continued)

FOREIGN PATENT DOCUMENTS

JP H05-207239 A 8/1993
JP 2004-264529 A 9/2004
(Continued)

Primary Examiner — Negussie Worku
(74) Attorney, Agent, or Firm — Scully, Scott, Murphy & Presser, PC

(57) ABSTRACT

In an image reader, a controller control, during a period from a timing when a detector detects an open state of a cover to a timing when the detector detects a closed state of the cover, a document detector to detect whether a document sheet is present or absent every time a prescribed time period is elapsed, and stores in a memory each set of first data indicating absence or presence of the document sheet. The controller determines a first size of the document sheet in a main scanning direction. The controller determines a second size of the document sheet in a sub scanning direction on the basis of the sets of first data. The controller determines a reading range on the basis of the first and second sizes. The reading section reads the determined reading range on the line-to-line basis to obtain an image of the document sheet.

5 Claims, 8 Drawing Sheets

(52) U.S. Cl.
CPC ..... *H04N 1/00816* (2013.01); *H04N 1/00835* (2013.01); *H04N 1/1013* (2013.01); *H04N 2201/0081* (2013.01)

(58) Field of Classification Search
CPC ...... H04N 1/40; H04N 1/40056; H04N 1/401; H04N 1/4076; H04N 1/409; H04N 1/484
USPC ....... 358/461, 471, 474, 1.15, 1.9, 443, 446, 358/448, 463, 465, 476, 477, 480, 482, 358/505, 509, 521, 525, 528; 347/234, 347/235, 248, 249, 250; 399/188, 202, 399/211, 212, 32, 36, 81
See application file for complete search history.

(56) References Cited

U.S. PATENT DOCUMENTS

| | | | | |
|---|---|---|---|---|
| 8,270,863 | B2* | 9/2012 | Okano | G03G 15/55 399/71 |
| 8,570,545 | B2* | 10/2013 | Okunishi | H04N 1/00002 347/140 |
| 9,407,782 | B2* | 8/2016 | Yamada | H04N 1/0066 |
| 2004/0165223 | A1 | 8/2004 | Ishido et al. | |
| 2009/0068279 | A1* | 3/2009 | Richard | A61K 9/1635 424/497 |
| 2009/0244647 | A1* | 10/2009 | Kawai | H04N 1/409 358/463 |
| 2010/0021202 | A1* | 1/2010 | Okano | G03G 15/55 399/114 |
| 2010/0232711 | A1 | 9/2010 | Takeshima | |
| 2015/0341509 | A1* | 11/2015 | Yamada | H04N 1/0066 358/474 |
| 2016/0295069 | A1* | 10/2016 | Shintani | H04N 1/3876 |
| 2016/0323466 | A1* | 11/2016 | Sato | H04N 1/00713 |
| 2017/0111527 | A1* | 4/2017 | Yamada | H04N 1/00551 |

FOREIGN PATENT DOCUMENTS

| | | |
|---|---|---|
| JP | 2005-278200 A | 10/2005 |
| JP | 2010-219667 A | 9/2010 |

* cited by examiner

| REFERENCE DATA | COVER STATE FLAG CFG |
|---|---|
| FIRST BLACK DATA BK1 | 1 or 0 |
| FIRST WHITE DATA WH1 | 1 or 0 |
| SECOND WHITE DATA WH2 | 1 or 0 |
| SECOND BLACK DATA BK2 | 1 or 0 |

1: COVER CV IS IN THE OPEN STATE
0: COVER CV IS IN THE CLOSED STATE

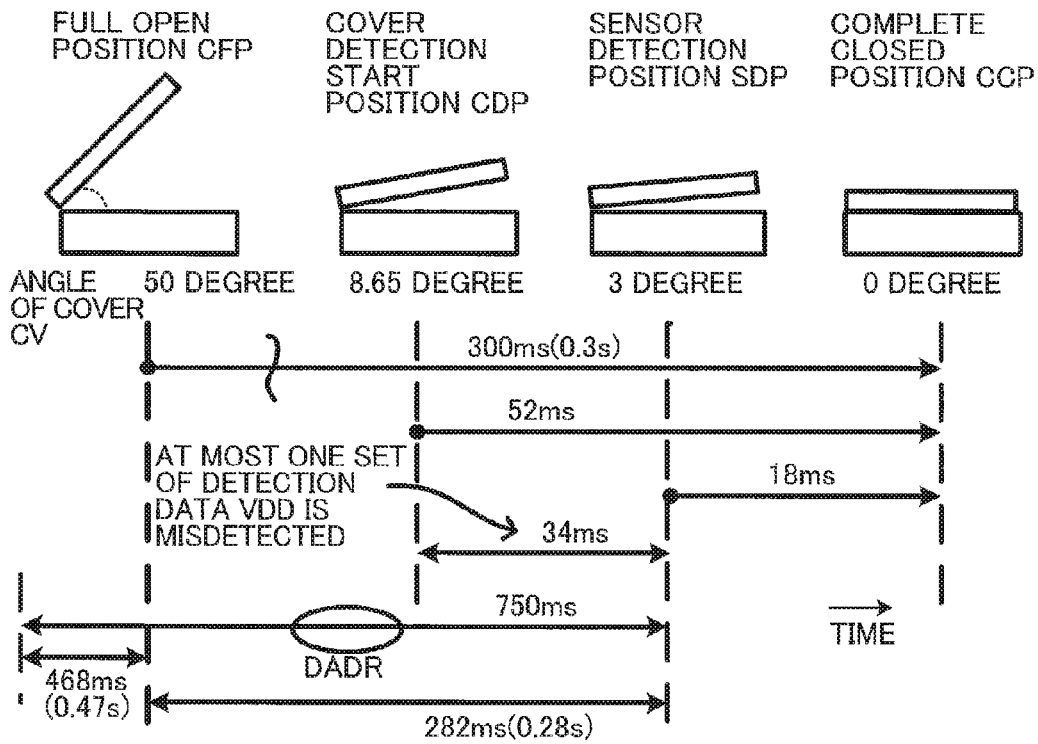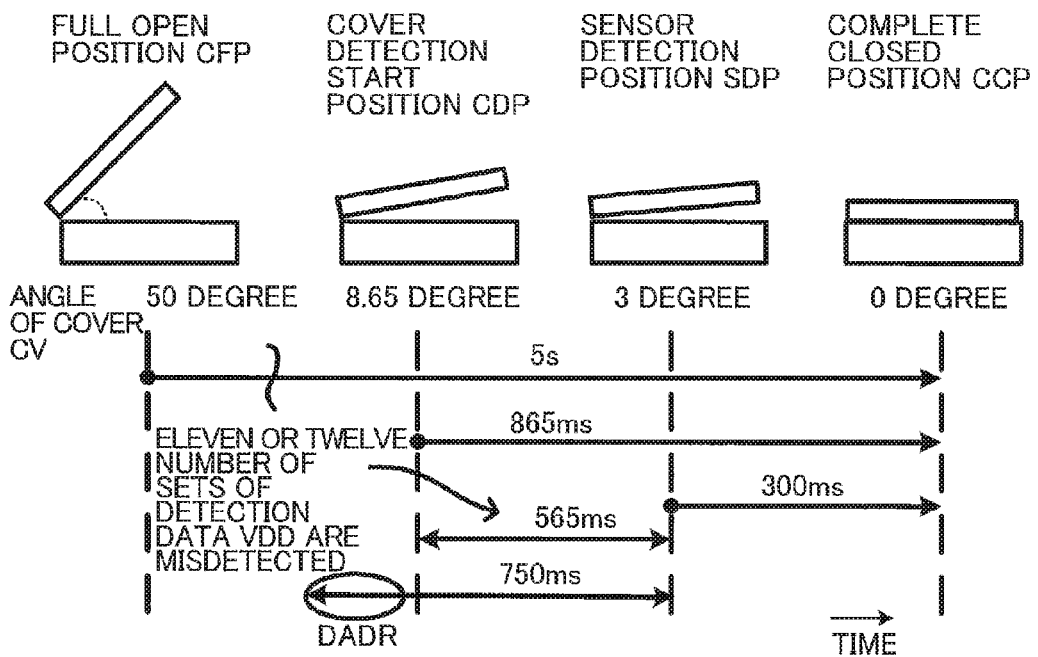
FIG. 8

IMAGE READER HAVING DOCUMENT DETECTOR FOR DETECTING PRESENCE OR ABSENCE OF DOCUMENT SHEET TO DETERMINE READING RANGE

CROSS REFERENCE TO RELATED APPLICATION

This application claims priority from Japanese Patent Application No. 2016-005879 filed Jan. 15, 2016. The entire content of the priority application is incorporated herein by reference.

TECHNICAL FIELD

The present disclosure relates to an image reader.

BACKGROUND

Japanese Patent Application Publication No. 2005-278200 discloses an image reader having an angle sensor and a document detection sensor. The angle sensor detects a near-closed position where a cover is about to be closed and to cover a platen. The document detection sensor detects the document sheet when the cover is at the near-closed position. The size of the document sheet in the sub-scanning direction is determined using a result of detection by the document detection sensor. A reading section also detects the document sheet when the cover is at the near-closed position. The size of the document sheet in the main scanning direction is determined using a result of detection by the reading section. The image reader determines a size of the entire document sheet using the sizes of the document sheet in the sub-scanning direction and in the main scanning direction.

SUMMARY

It may be preferable that the near-closed position is as close as possible to both the reading section and the document detection sensor in order to reduce misdetection caused by light from outside of the image reader (hereinafter, referred to as "an ambient light"). It may also be preferable that the near-closed position is a position where neither the reading section nor the document detection sensor helps determining a surface of the cover facing the platen as the document sheet. Here, the surface of the cover is generally white color.

A length of an optical path between the document detection sensor and the document sheet is different from a length of an optical path between the reading section and the document sheet. A most suitable near-closed position for the reading section is different from a most suitable near-closed position for the document detection sensor.

Accordingly, it is conceivable that the cover is at the near-closed position where neither the reading section nor the document detection sensor is affected by the ambient light. It is also conceivable that the cover is at the near-closed position where the cover is close to both the reading section and the document detection sensor. This configuration allows the reading section to correctly detect that the document sheet does not exist when the cover is at the near-closed position. On the other hand, the document detection sensor may help determining the cover as the document sheet when the cover is at the near-closed position though the document sheet does not exist actually.

In view of the foregoing, it is an object of the present disclosure to provide an image reader correctly determining a size of a document sheet even if a near-closed position of a cover detected by an angle sensor is not a most suitable position for both the document detection sensor and an image reading section.

In order to attain the above and other objects, the disclosure provides an image reader. The image reader includes a reading section, a document detector, a cover, a detector, a memory, and a controller. The reading section has a platen, a light source, and a light receiver. The light receiver includes a plurality of light receiving elements arranged in a line extending in a main scanning direction. Each of the plurality of light receiving elements corresponding to a pixel. The reading section is configured to move in a sub scanning direction orthogonal to the main scanning direction to read a document placed on the platen on a line-to-line basis. The platen having a reference point at which a vertex of a document sheet is positioned. The document detector is located at a first detection position separated from the reference point in the sub scanning direction by a prescribed distance. The document detector being configured to detect absence or presence of the document sheet. The cover configured to change between a closed state in which the cover covers the reading section and an open state in which the cover does not cover the reading section. The detector is configured to detect whether the cover is in the closed state and the open state. The controller is configured to: a) control, during a period from a timing when the detector detects the open state to a timing when the detector detects the closed state, the document detector to detect whether the document sheet is present or absent every time a prescribed time period is elapsed, and store in the memory each set of first data indicating absence or presence of the document sheet on a basis of the detected result of the document detector; b) determine a first size of the document sheet in the main scanning direction by controlling the reading section to read a partial image of the document sheet when the detector detects change in state from the open state to the closed state; c) determine a second size of the document sheet in the sub scanning direction on a basis of the sets of first data when the detector detects change in state from the open state to the closed state; and d) determine a reading range on a basis of the first size and the second size, the reading section being configured to read the determined reading range on the line-to-line basis to obtain an image of the document sheet while moving in the sub scanning direction.

According to another aspects, the disclosure provides an image reader includes a reading section, a document detector, a cover, a cover detector, a memory, and a controller. The reading section has a platen, a light source, and a light receiver. The light receiver includes a plurality of light receiving elements arranged in a line extending in a main scanning direction. The reading section is configured to move in a sub scanning direction orthogonal to the main scanning direction to read a document placed on the platen on a line-to-line basis. The platen has a reference point. The document detector is located at a first detection position separated from the reference point in the sub scanning direction by a prescribed distance. The cover is movable between a closed state and an open state. The cover detector is configured to detect whether the cover is in the closed state or the open state. The controller is configured to: a) obtain an output from the document detector every particular time period until the cover detector detects the closed state since the cover detector detects the open state; b) store in the memory each set of first data representing the output from the document detector, each set of first data indicating absence of presence of the document sheet; c) when the cover detector detects the closed state since the cover detector detects the open state, control the reading section to read a partial range of the document sheet; d) obtain partial image data on a basis of output from the reading section while reading the partial image; e) determine a first size of the document sheet in the main scanning direction on a basis of the partial image data; f) determine a second size of the document sheet in the sub scanning direction on a basis of the sets of first data when the cover detector detects the closed state since the cover detector detects the open state; g) determine a reading range on a basis of the first size and the second size; h) control the reading section to read the determined reading range on the line-to-line basis; and i) obtain image data on a basis of output from the reading section while reading the determined reading range.

BRIEF DESCRIPTION OF THE DRAWINGS

The particular features and advantages of the disclosure as well as other objects will become apparent from the following description taken in connection with the accompanying drawings, in which:

FIG. 8 is an explanatory diagram illustrating procedures for determining a document state.

DETAILED DESCRIPTION

Structure of Image Reader SM

Figure 1:
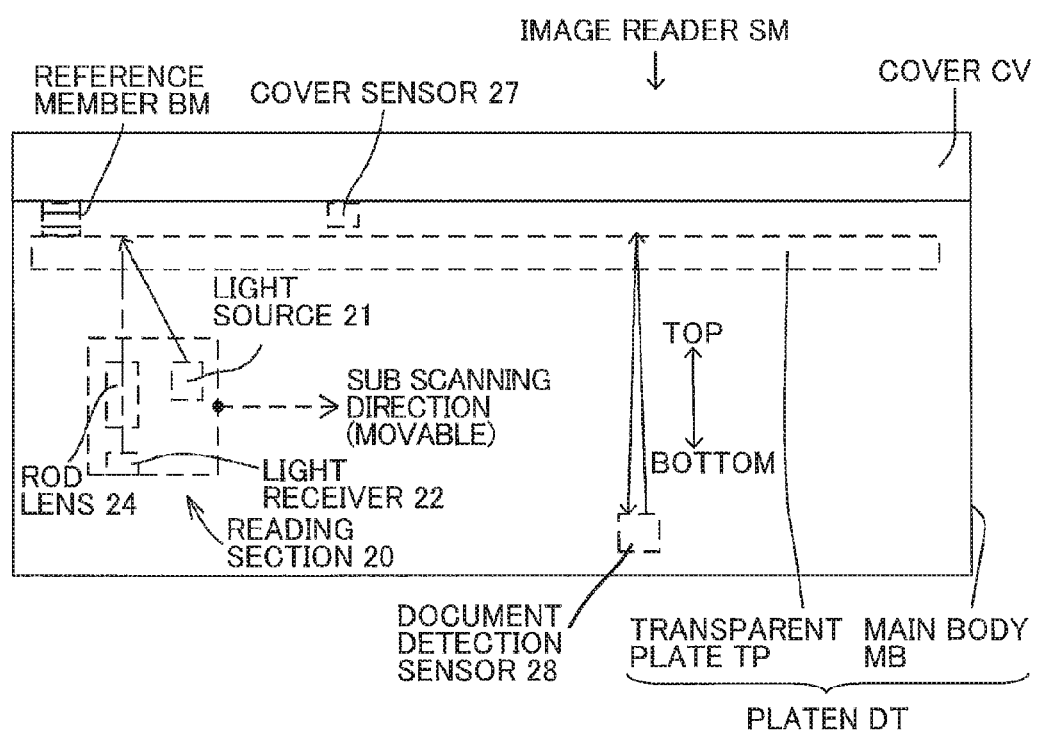
FIG. 1 is a front view of an image reader according to an embodiment.
Figure 2:
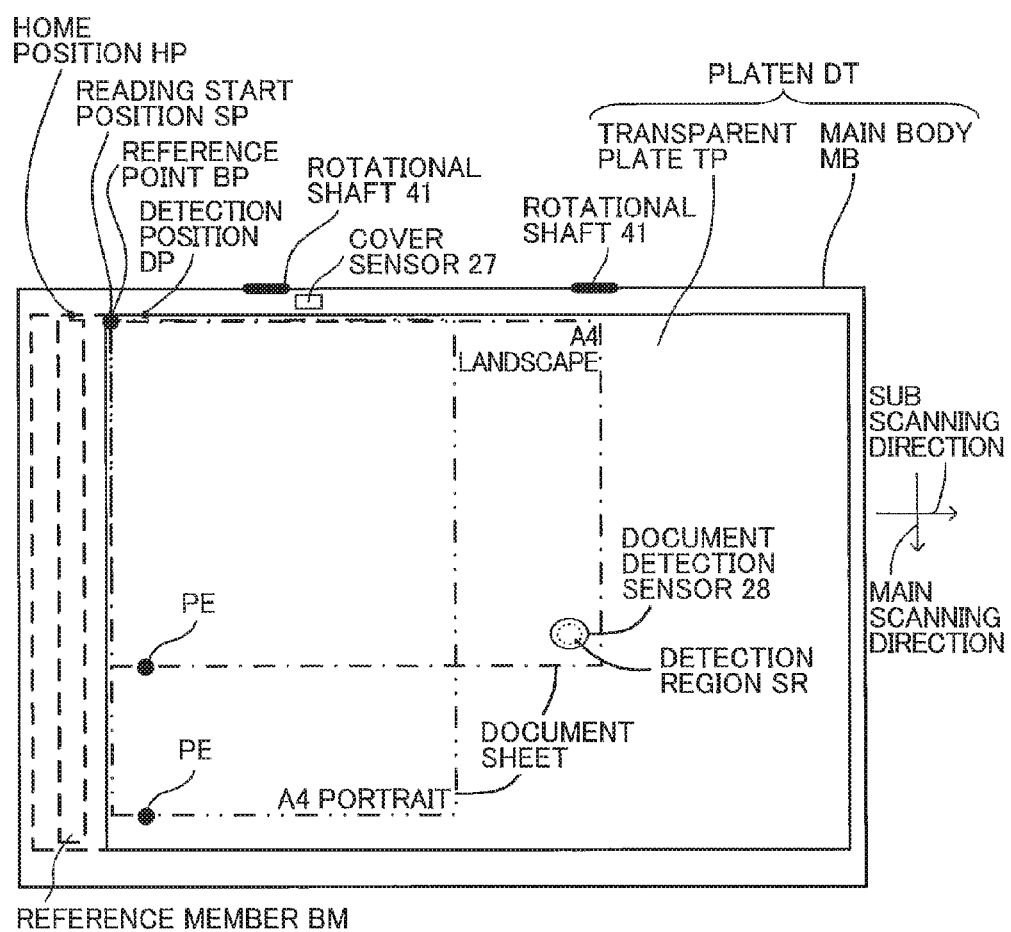
FIG. 2 is a top view of a platen according to the embodiment.

FIG. 1 is a front view of an image reader SM according to an embodiment. FIG. 2 is a top view of a platen DT. In the following descriptions, a lower direction of FIG. 2 indicates a downstream side of a main scanning direction, a right direction of FIGS. 1 and 2 indicates a downstream side of a sub scanning direction orthogonal to the main scanning direction. The image reader SM includes the platen DT, and a cover CV. The platen DT includes a main body MB and a transparent plate TP. The main body MB is a casing for accommodating various members such as the transparent plate TP and a reading section 20. The transparent plate TP is fixedly accommodated in the main body MB. A document sheet is placed on the transparent plate TP. The cover CV is arranged above the main body MB and is capable of moving between an open position and a closed position. The cover CV does not cover the main body MB at the open position. The cover CV covers the main body MB at the closed position. The cover CV has a rotational axis 41 at a far side of the main body MB (a far side with respect to an orthogonal direction of FIG. 1, or a upper side of FIG. 2). A near side of the cover CV moves upward to open the main body MB when the cover CV is rotated about the rotational axis 41. Here, the near side is a near side with respect to the orthogonal direction of FIG. 1, or a lower side of FIG. 2.

The image reader SM further includes the reading section 20 and a document detection sensor 28. The reading section 20 is accommodated in the main body MB below the transparent plate TP. The reading section 20 is movable relative to the main body MB in the sub-scanning direction (that is, the left and right direction of FIG. 1). The reading section 20 reads the documents sheet placed on the transparent plate TP. The reading section 20 may be a contact image sensor (CIS) that includes a light source 21, a rod lens 24, and a light receiver 22. The light source 21 includes light emitting diodes (LEDs) for red, blue, and green and irradiates light toward the transparent plate TP. The rod lens 24 receives reflected light originally irradiated from the light source 21. The document detection sensor 28 is located at a position as shown in FIGS. 1 and 2 so that the document detection sensor 28 is capable of detecting an A4 size document sheet placed in a landscape posture (or lateral arrangement, see one dot chain line in FIG. 2) on the transparent plate TP and is incapable of detecting the A4 size document placed in a portrait posture (or longitudinal arrangement, see two-dot chain line in FIG. 2) on the transparent plate TP. The document detection sensor 28 includes a light emitting portion (not shown) and is located at a position neighboring a bottom of the main body MB. Here, when the A4 size document sheet is placed in the landscape posture on the transparent plate TP, the longitudinal side of the document sheet extends in the sub scanning direction. When the A4 size document sheet is placed in the portrait posture in the transparent plate TP, the longitudinal side of the document sheet extends in the main scanning direction. A light path concerning the reading section 20 is a path of light transmitted from the light source 21, reflected by the transparent plate TP (or, the document sheet or the cover CV), and received by the light receiver 22. A length of the light path (or optical length) for light transmitted from the reading section 20 (hereinafter, referred to as a first length) is a distance of the light transmitted from the light source 21 and received by the light receiver 22 through the light path concerning the reading section 20. A light path concerning the document detection sensor 28 is a path of light transmitted from the document detection sensor 28, reflected by the transparent plate TP (or, the document sheet or the cover CV), and received by the document detection sensor 28. The length of the light path (or optical length) of the document detection sensor 28 (hereinafter, referred to as a second length) is a distance of the light transmitted from and received by the document detection sensor 28 through the light path concerning the document detection sensor 28. The document detection sensor 28 is configured (or arranged) so that the second length is longer than the first length. The document detection sensor 28 is capable of detecting existence or absence of the document sheet on a detection region SR of the transparent plate TP as encircled by a broken line of FIG. 2.

The light receiver 22 includes a plurality of photoelectric conversion elements 23 arranged in the main scanning direction, and has a built-in shift register (not shown) and a built-in amplifier (not shown). The plurality of photoelectric conversion elements 23 respectively corresponds to a plurality of pixels. That is, the plurality of pixels is arranged in a line extending in the main scanning direction. Output of each photoelectric conversion element 23 indicates an amount of received light a corresponding pixel. A first pixel among the plurality of pixels is located at a top side of FIG. 2, that is, at an end position of a side of a reference point BP (described later). A last pixel is located at a bottom side of FIG. 2, that is, at an end of a side opposite to the reference point BP. In other words, the first pixel is located at upstream end in the main scanning direction whereas the last pixel is located at downstream end in the main scanning direction. In the embodiment, one line is configured of the plurality of pixels from the first pixel to the last pixel.

A top surface of the platen DT includes a top surface of the main body MB and a partial region of a top surface of the transparent plate TP exposed to the cover CV (hereinafter, referred to as the cover side region). The cover side region of the transparent plate TP is drawn by solid line in FIG. 2. A cover sensor 27, and two rotational shafts 41 are arranged in the main body MB. The transparent plate TP has a rectangle shape including a longitudinal side extending in the sub scanning direction and a short side extending in the main scanning direction. The reference point BP is located at an upstream end in the main scanning direction of the cover side region and an upstream end in the sub scanning direction of the cover side region. A document sheet is placed on the transparent plate TP on the basis of the reference point BP as a cardinal point. That is, the document sheet is placed on the transparent plate TP so that a corner of the document sheet is on the reference point BP. The transparent plate TP includes a document region for placing the document sheet. The document region extends toward downstream side of the main scanning direction and downstream side of the sub scanning direction from the reference point BP. For example, the document region is a region drawn by the one dot chain line shown in FIG. 2 when an A4 size document sheet is placed on the transparent plate TP in the landscape posture. Or, the document region is a region drawn by the two-dot chain line shown in FIG. 2 when an A4 size document sheet is placed on the transparent plate TP in the portrait posture. The cover CV is rotated between the open position and the closed position about the two rotational shafts 41. The two rotational shafts 41 are arranged at an upstream side of the main body MB in the main scanning direction. The cover sensor 27 is located at vicinity of the rotational shaft 41. The cover sensor 27 is ON (or outputs on-signal) when the cover CV is in an open state. The cover sensor 27 is OFF (or outputs off-signal) when the cover CV is in a closed state. Here, the open state of the cover CV indicates that the cover CV opens and the closed state of the cover CV indicates that the cover CV is closed. When the cover CV is at a sensor detection position SDP, the cover sensor 27 detects that the cover CV is changed from the open state to the closed state. When the cover is the sensor detection position SDP, the cover CV forms an angle of 3° with the main body MB. The sensor detection position SDP is a position where ambient light from periphery of the main body MB influences on neither the reading section 20 nor the document detection sensor 28. The reading section 20 does not detect a surface of the cover CV facing the reading section 20 when the cover CV is at the sensor detection position SDP. In other words, the closed state is detected when the cover CV is at the sensor detection position SDP so that the cover CV is at a most suitable position for the reading unit 20.

The image reader SM further includes a reference member BM fixed to the top surface of the transparent plate TP, specifically fixed to a top surface of a region drawn by a dotted line in FIG. 2 that is outside of the cover side region. The reference member BM is located at upstream end of the transparent plate TP in the sub scanning direction, that is, left side of FIG. 2. The reference member BM is located left side of the reference point BP. The reference member BM is a white member extending in the main scanning direction. The reference member BM is used when first white data WH1, second white data WH2, and fourth white data WH4 described later are acquired or when the light source 21 is adjusted. The reference member BM is a width (a length in the sub scanning direction) of 10 mm. A home position HP is defined as a center position of the reference member BM in the sub scanning direction. The reading section 20 is movable in the sub scanning direction based on the home position HP as a reference. A detection position DP is defined as a reading position at which the reading section 20 is positioned when a document size determination process (described later) is performed. Specifically, the detection position DP is a position in the sub scanning direction at which the reading section 20 is positioned when the reading section 20 detects a length of the document sheet, which is placed on the platen DT, in the main scanning direction. The detection position DP is separated from the reference point BP toward downstream side of the reference point BP in the sub scanning direction by 10 mm. A reading start position SP is defined as a position in the sub scanning direction at which the reading section 20 is positioned when the reading process starts. The reading start position SP is a position in the sub scanning direction matching the reference point BP in the sub scanning direction.

Electrical Configuration of Image Reader SM

Figure 3:
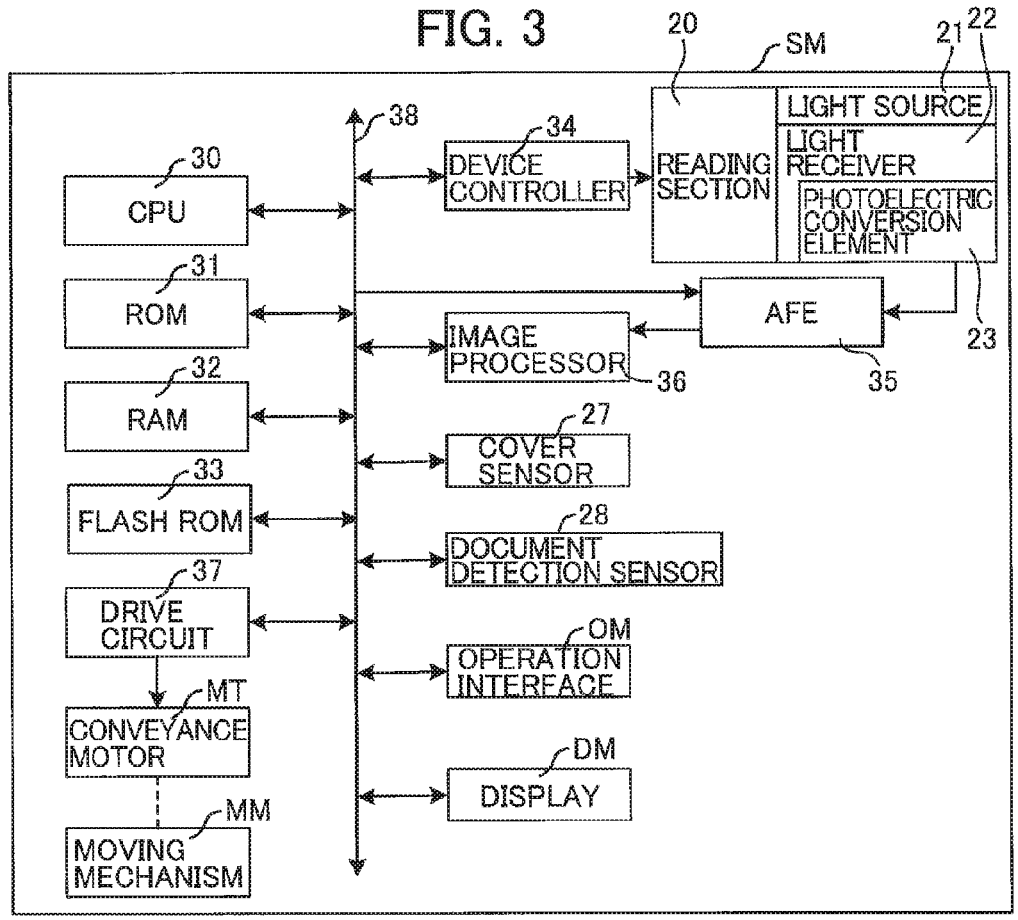
FIG. 3 is a block diagram illustrating electrical configurations of the image reader and a structure of data in a RAM.

Electrical configuration of the image reader SM will be explained with reference to FIG. 3. The image reader SM includes a CPU 30, a ROM 31, a RAM 32, a flash ROM 33, a device controller 34, an Analogue Front End (AFE) 35, an image processor 36, a drive circuit 37, an operation interface OM, a display DM, the cover sensor 27, and the document detection sensor 28. The elements 30-37 are connected to the operation interface OM, the display DM, the cover sensor 27, and the document detection sensor 28 via a bus. The operation interface OM includes a plurality of keys, such as a start button and a determination button. The user can input various instructions to the operation interface OM by operating thereof. The display DM is for displaying various information.

The ROM 31 stores various programs for executing processes for operating the image reader SM, such as, a main reading process and subroutines in each main process. The CPU 30 controls each section of the image reader SM according to a program read from the ROM 31. The flash ROM 33 is a nonvolatile memory capable of storing data and outputting the data therein. The flash ROM 33 stores various types of data generated in a control process executed by the CPU 30, such as, data acquired in the main reading process. The RAM 32 temporarily stores arithmetic results acquired in the control process executed by the CPU 30. In the embodiment, the RAM 32 stores cover state flags CFG, and reference data, such as first black data BK1, the first white data WH1, second white data WH2, second black data BK2 in association with the respective cover state flags CFG.

The device controller 34 is connected to the reading section 20. The device controller 34 transmits to the light source 21 signal for controlling the light source 21 to turn on or off, and signal for controlling current value flowing in the light source 21, according to instructions from the CPU 30. The device controller 34 transmits to the light receiver 22 serial-in signal for transferring electric signals from the plurality of photoelectric conversion elements 23 to the shift register (not shown) at a time, and clock signal for sequentially outputting electric signals from the shift register, according to instructions from the CPU 30. When the reading section 20 receives the above described signals from the device controller 34, the reading section 20 turns on the light source 21, and outputs analog signal to the AFE 35 on the basis of an amount of light received in the light receiver 22.

The AFE 35 is connected to the reading section 20. The AFE 35 converts analog signal outputted from the reading section 20 to digital data according to instructions from the CPU 30. The AFE 35 has a predetermined input range and a predetermined resolution. For example, when the resolution is 10 bit, the data is represented by one of gradation levels from "0" to "1023". In this case, the AFE 35 converts the analog signal transmitted from the reading section 20 to gradation data of 10 bit (0-1023) as the digital data. The digital data generated by the AFE 35 transmitted to the image processor 36. An offset adjustment value and a gain adjustment value are set to the AFE 35. The offset adjustment value is for offset-adjusting analog signal transmitted from the reading section 20. The gain adjustment value is for performing gain adjustment on the offset-adjusted analog signal. The AFE 35 converts the offset-adjusted and gain-adjusted analog signal to the digital data.

The image processor 36 is configured of ASIC (Application Specific Integrated Circuit) dedicated for image processes, and performs various image processes on the digital data. The image processes are, for example, correction processes such as shading correction and gamma correction. The image processor 36 is set settings whether each process is performed. So, the image processor 36 can be set so that none of image processes is performed or all the image processes are performed. The image processor 36 performs each set process on the digital data and generates digital image data. The generated digital image data is stored in the RAM 32 transmitted via the bus 38. The shading correction includes white correction and black correction. Black correction data and white correction data are set inside the image processor 36. The black correction data and the white correction data are for the black correction and the white correction respectively. For example, when the image processor 36 is set so that the gamma correction is not performed and the shading correction is performed, the image processor 36 performs the black correction on the digital data according to the set black correction data and performs the white correction on the black corrected digital data according to the set white correction data to generate the digital image data.

The drive circuit 37 is connected to a conveyance motor MT. The conveyance motor MT is connected to a moving mechanism MM. The drive circuit 37 drives the conveyance motor MT on the basis of a drive instruction transmitted from the CPU 30. The drive circuit 37 controls the conveyance motor MT to rotate in an instructed rotation amount in an instructed rotational direction according to the drive instruction. When the conveyance motor MT rotates in a prescribed rotation amount, the moving mechanism MM rotates a prescribed angle, and the reading section 20 is moved a prescribed distance in the sub scanning direction.

Operations

Operations of the image reader SM will be explained while referring to FIGS. 4-6. The image reader SM performs the main reading process for reading the document sheet. The CPU 30 performs processes R1-R14 in the main reading process and processes in subroutines.

Main Reading Process

Figure 4:
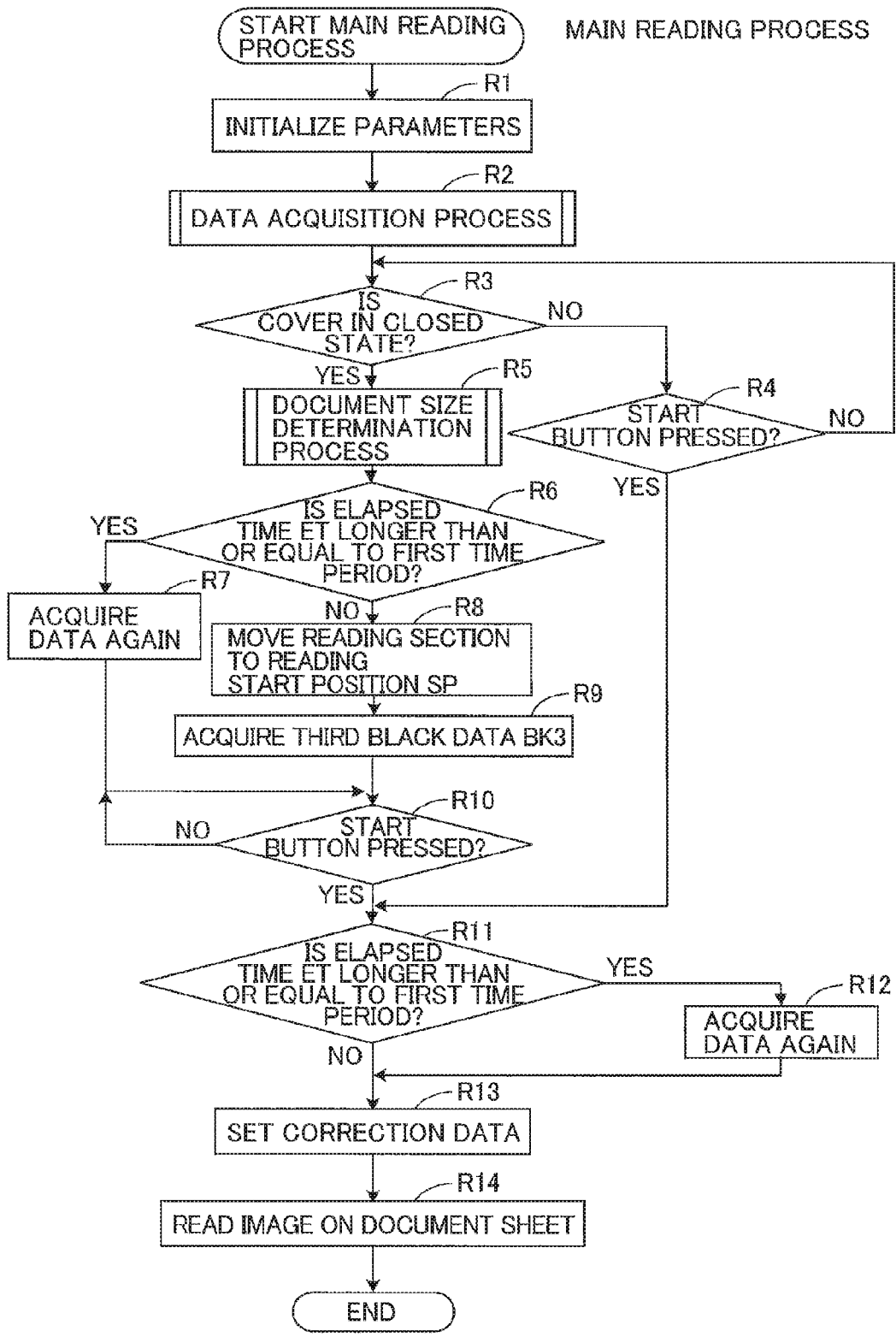
FIG. 4 is a flowchart illustrating a main reading process according to the embodiment.

The main reading process shown in FIG. 4 is started when the user opens the cover CV. That is, the CPU 30 starts the main reading process when the cover sensor 27 is ON. In the embodiment, 600 dpi is set as a reading resolution of the main reading process and color mode is set in the main reading process. Note that when the cover CV is opened again during execution of the main reading process, the main reading process is restarted from the beginning.

When the main reading process is started, in R1 the CPU 30 moves the reading section 20 to the home position HP via the drive circuit 37, subsequently initializes the device controller 34, the AFE 35, and image processor 36, and starts counting a cover detection time CT from a value "0". Specifically, the CPU 30 transmits a drive instruction to the drive circuit 37 for moving the reading section 20 so that the reading position of the reading section 20 matches the home position HP. The CPU 30 acquires settings for clock signal and serial-in signal depending on the reading resolution of 600 dpi from the flash ROM 33 and sets the device controller 34 on the basis of the acquired settings. The CPU 30 acquires the offset adjustment value and the gain adjustment value of the AFE 35 from the flash ROM 33 and sets the AFE 35 on the basis of the acquired values. The CPU 30 does not perform any image process in the processes R1-R4, and R6-R12. The CPU 30 starts counting the cover detection time CT from the value "0".

In R2 the CPU 30 performs a data acquisition process for acquiring each data of the reading section 20 after the cover CV opens. The CPU 30 starts a document detection process in which the document detection sensor 28 detects the document sheet every 50 ms (milliseconds). The CPU 30 acquires the first black data BK1, the first white data WH1, the second white data WH2, and the second black data BK2 as the reference data. The CPU 30 counts an elapsed time ET from a value "0", and calculates first white black difference data WBD1, and stores the calculated first white black difference data WBD1 in the flash ROM 33 as final white black difference data RWBD. The CPU 30 moves the reading section 20 to the detection position DP by using the drive circuit 37. Details of the data acquisition process will be described later.

In R3 the CPU 30 determines whether the cover CV is in the closed state. Specifically, when the cover sensor 27 is OFF, the CPU 30 determines that the cover CV is in the closed state (R3: YES), stops counting the cover detection time CT, and proceeds to R5. When the cover sensor 27 is ON, the CPU 30 determines that the cover CV is in the open state (R3: NO), then proceeds to R4.

When the cover CV is determined to be in the open state (R3: NO), in R4 the CPU 30 determines whether the start button of the operation interface OM is pressed. When the CPU 30 determines that the start button is pressed (R4: YES), the CPU 30 moves the reading section 20 to the reading start position SP via the drive circuit 37, sets a document size PS of the document sheet on the platen DT to a maximum reading range, and proceeds to R11. When the CPU 30 determines that the start button of the operation interface OM does not pressed (R4: NO), the CPU 30 returns to R3.

When the cover CV is in the closed state (R3: YES), in R5 the CPU 30 performs a document size determination process for determining the document size PS of the document sheet on the platen DT. The CPU 30 controls the reading section 20 to read the document sheet at the detection position DP to detect a document end PE indicating an end of the document sheet in the main scanning direction. The CPU 30 determines a document state PA specifying presence or absence of the document sheet on the detection region SR on the basis of detection data VDD. The CPU 30 finally determines the document size PS on the basis of the document end PE and the document state PA. In this process (R5), the CPU 30 sets the image processor 36 so as to perform the shading correction but not to perform the gamma correction. The CPU 30 sets the image processor 36 so that none of the image processes is performed after completing this process (R5). Details of the document size determination process will be described later.

In R6 the CPU 30 determines whether the elapsed time ET is longer than or equal to a prescribed first time period. Specifically, when the elapsed time ET is longer than or equal to the first prescribed time (R6: YES), the CPU 30 proceeds to R7. When the elapsed time ET is shorter than the prescribed first time period (R6: NO), the CPU 30 proceeds to R8. The first prescribed time is one minute for example. This is because environment such as temperature around the image reader SM will be changed and the reference data may not correspond to the changed environment after one minute passes.

When the elapsed time ET is longer than or equal to the prescribed first time period (R6: YES), in R7 the CPU 30 acquires each data of the reading section 20 again. Specifically, the CPU 30 moves the reading section 20 to the home position HP by using the drive circuit 37. The CPU 30 acquires, as reference data, fourth black data BK4 and the fourth white data WH4. The CPU 30 calculates fourth white black difference data WBD4. The CPU 30 resets the elapsed time ET to a value "0", and starts count the elapsed time ET from the value "0" again. The CPU 30 stores the fourth white black difference data WBD4 as the final white black difference data RWBD in the flash ROM 33. The CPU 30 moves the reading section 20 to the reading start position SP by using the drive circuit 37. After completing R7, the CPU 30 proceeds to R10.

When the elapsed time ET is shorter than the prescribed first time period (R6: NO), in R8 the CPU 30 moves the reading section 20 to the reading start position SP by using the drive circuit 37. Specifically, the CPU 30 transmits a drive instruction to the drive circuit 37 for moving the reading section 20 so that the reading position of the reading section 20 matches the reading start position SP.

In R9 the CPU 30 acquires third black data BK3 of the reading section 20 as the reference data. Specifically, the CPU 30 turns off the light source 21, and controls the reading section 20 to read the document sheet or the cover CV. The CPU 30 acquires digital image data of one color for each pixel in one line as the third black data BK3. The third black data BK3 is acquired while the light source 21 is turned off for each color, and thus the third black data BK3 is monochromatic data (data for a single color).

In R10 the CPU 30 determines whether the start button of the operation interface OM is pressed. When the start button of the operation interface OM is pressed (R10: YES), the CPU 30 proceeds to R11. When the start button is not pressed (R10: NO), the CPU 30 waits until the start button is pressed.

In R11 the CPU 30 determines whether the elapsed time ET is longer than or equal to the prescribed first time period. Specifically, when the elapsed time ET is longer than or equal to the first prescribed time period (R11: YES), the CPU 30 proceeds to R12. In R12 the CPU 30 acquires each data again similarly to R7. After completing the process R12, the CPU proceeds to R13. When the elapsed time ET is shorter than the prescribed first time period (R11: NO), the CPU 30 proceeds to R13.

In R13 the CPU 30 makes settings of the image processor 36 by using the white correction data and the black correction data. Specifically, when the fourth white black difference data WBD4 is stored as the final white black difference data RWBD in the flash ROM 33, the CPU 30 makes settings of the image processor 36 by using the fourth white black difference data WBD4 as the white correction data and using the fourth black data BK4 as the black correction data.

When the first white black difference data WBD1 is stored as the final white black difference data RWBD in the flash ROM 33, the CPU 30 determines whether count of the cover detection time CT is continued. When the count of the cover detection time CT is continued, the CPU 30 makes settings of the image processor 36 by using first white black difference data WBD1 as the white correction data and using first black data BK1 as the black correction data. Because the first black data BK1 is set as the black correction data, the first black data BK1 is latest black data at a timing of R13, thereby performing a black correction process reflecting latest state of the reading section 20 in a subsequent reading process R14. When the count of the cover detection time CT is stopped, the CPU 30 makes settings of the image processor 36 by using the first white black difference data WBD1 as the white correction data for and using the third black data BK3 as the black correction data.

The CPU 30 further makes settings of the image processor 36 by using the setting value indicating that all the image processes are performed.

In R14, the CPU 30 reads an image on the document sheet. Specifically, the CPU 30 transmits an instruction to the drive circuit 37 for moving the reading section 20 and controls the light source 21 to irradiate light at an intensity ST to read the image of the document sheet in the document size PS. The read image is stored in the RAM 32 in order to be printed by a printer (not shown) or be outputted to an external apparatus as image data.

Acquisition Process R2 when the Cover CV Opens

Figure 5:
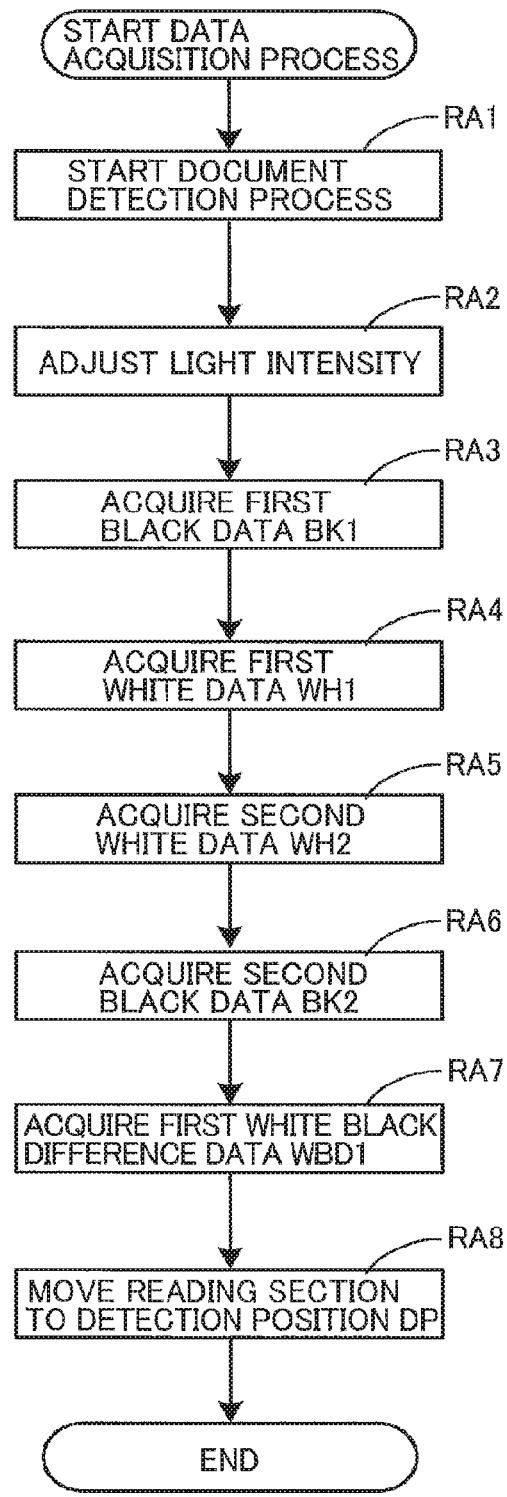
FIG. 5 is a flowchart illustrating a data acquisition process according to the embodiment.

When the acquisition process R2 is started, in RA1 of FIG. 5 the CPU 30 performs a document detection process in which the document detection sensor 28 detects presence of the document sheet or absence of the document sheet on the detection region SR. The document detection process is performed in parallel to processes (RA2, RA3, and so on) subsequent to RA1.

Figure 7:
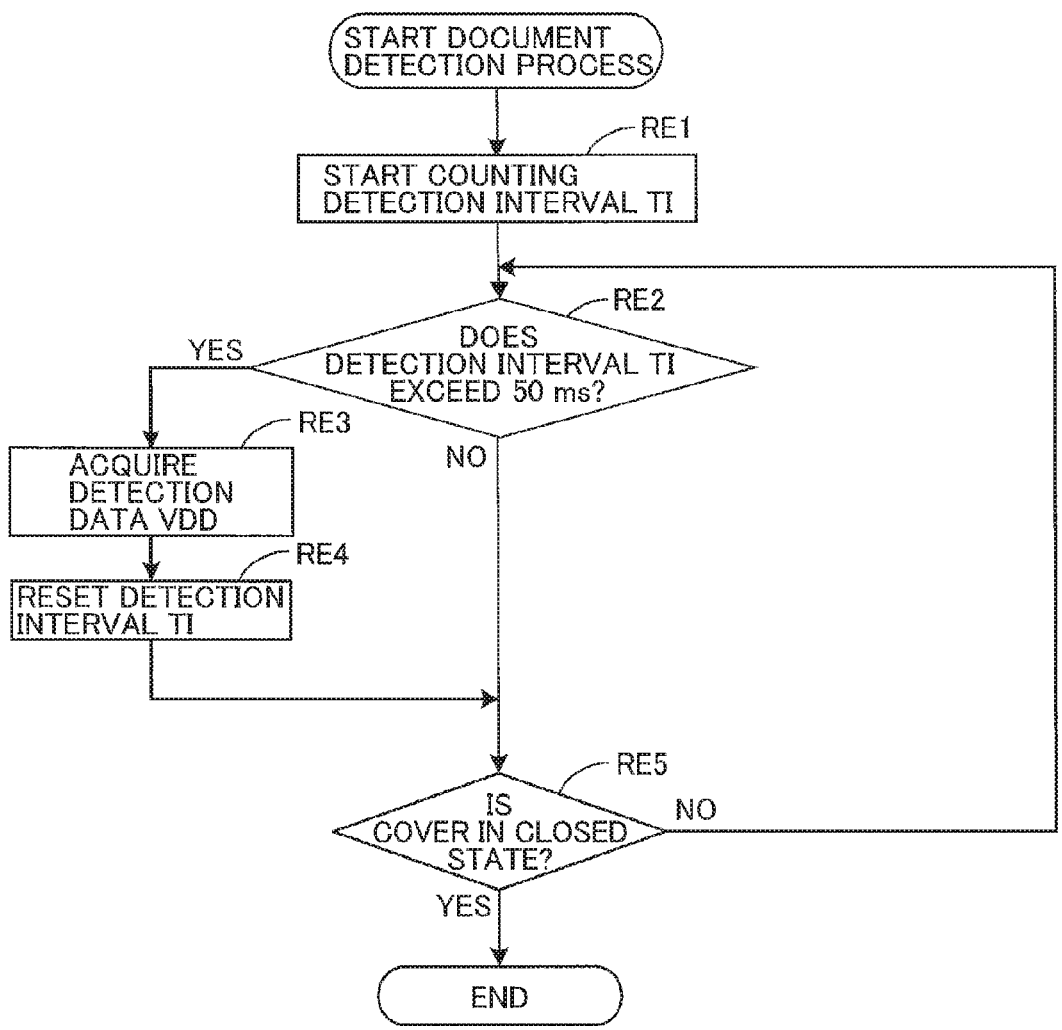
FIG. 7 is a flowchart illustrating a document detection process.

When the document detection process is started in RA1, in RE1 of FIG. 7 the CPU 30 counts a detection interval TI from a value "0". In RE2, the CPU 30 determines whether the detection interval TI exceeds 50 ms (milliseconds). When the detection interval TI does not exceed 50 ms (RE2: NO), the CPU 30 proceeds to RE5. When the detection interval TI exceeds 50 ms (RE2: YES), the CPU 30 proceeds to RE3. Here, the document detection sensor 28 erroneously detects the cover CV as the document sheet when the document sheet is not on the detection region SR within a period of 34 ms (mili seconds) from a timing of a cover detection start position CDP to a timing of the sensor detection position SDP, in a fastest case (FIG. 8) as described later. In the embodiment, the detection interval TI is 50 ms (mili seconds) longer than 34 ms (mili seconds) in order to prevent misdetection in the fastest case.

When the detection interval TI exceeds 50 ms (mili seconds) (RE2: YES), in RE3 the CPU 30 controls the document detection sensor 28 to detect presence or absence of the document sheet on the detection region SR, and stores detection result (data indicating the presence or absence of the document sheet,) as the set of detection data VDD in the RAM 32. In a case where the 16 number of sets of the detection data VDD have been already stored in the RAM 32 at the detection timing of the current detection data VDD, the CPU 30 deletes the oldest set of detection data VDD in the RAM 32 and stores the current set of detection data VDD. When the number of sets of the detection data VDD is smaller than 16, the CPU 30 stores the current set of detection data VDD in addition to the already stored sets of detection data VDD in the RAM 32. After completing RE3, in RE4 the CPU 30 resets the detection interval TI to a value "0" and restarts counting the detection interval TI from the value "0". It may occur a case where the document detection sensor 28 detects the absence of the document sheet at a timing before the document sheet is placed on the platen and when the cover is at a full open position CFP, and subsequently the document detection sensor 28 detects the presence of the document sheet after the document sheet is placed on the platen. In this case, the CPU 30 acquires a set of data indicating the absence of the document sheet that is detected before the document sheet is placed on and a set of data indicating the presence of the document that is detected after the document sheet is placed on the platen DT. In the embodiment, it is assumed that 1 second is required for starting closing the cover CV from a timing when the document sheet is placed on the platen DT, and that 0.2882 seconds are required for the cover moving from the sensor detection position SDP to the full open position CFP in a general fastest case. In the embodiment, in order to remain 16 number of sets of detection data VDD in the RAM 32 which are obtained after the document sheet is placed on the platen DT, the set of detection data VDD is detected every 50 ms (mili seconds), 16 number of sets of detection data VDD is stored in the RAM 32, and the sets of detection data VDD are obtained, as data indicating the presence/absence of the document sheet, in a period beginning from 750 ms (mili seconds) before the cover CV is closed. That is, the 16 number of sets of detection data VDD are acquired during a period of 0.75 seconds that is shorter than a assumed period of 1.282 seconds that is a period from a timing of the placement of the document on the platen DT sheet to a timing of the end of the detection.

In RE5 the CPU 30 determines whether the cover is closed, or in the closed state. When the cover sensor 27 is OFF, the CPU 30 determines that the cover CV is closed (RE: YES) and end the document detection process. When the cover sensor 27 is ON, the CPU 30 determines that the cover CV opens (RE: NO), and proceeds to RE2. The document detection process RA1 is performed in parallel to a process RA2 and subsequent processes of RA2.

After the document detection process RA1 is started, in RA2 (see FIG. 5) the CPU 30 adjusts the intensity ST of light emitted from the light source 21. Specifically, the CPU 30 controls the light source 21 to turn on in order to irradiate light to the reference member BM, and adjusts the corresponding intensity ST of light for each color so that the analog signal in the AFE 35 become a maximum within the input range of the AFE 35 when light reflected by the reference member BM is read. Here, colors of light emitted from the light source 21 include red, blue, and green.

In RA3 the CPU 30 acquires the first black data BK1 of the reading section 20 as the reference data. Specifically, the CPU 30 controls the light source 21 to turn off and controls the reading section 20 to read the reference member BM. The CPU 30 acquires a set of read digital image data for one color of each pixel in one line as a set of first black data BK1 of the one color of the each pixel in one line. When the cover sensor 27 is ON, the CPU 30 stores a value "1" as the cover state flag CFG in association with the first black data BK1 in the RAM 32. When the cover sensor 27 is OFF, the CPU 30 stores a value "0" as the cover state flag CFG in association with the first black data BK1 in the RAM 32.

In RA4 the CPU 30 acquires the first white data WH1 of the reading section 20 as the reference data. Specifically, the CPU 30 controls the light source 21 to turn on so as to emit light of each color at the corresponding intensity ST adjusted in RA2, and controls the reading section 20 to read the reference member BM. The CPU 30 acquires a set of read digital image data for each color of each pixel in one line as a set of first white data WH1 of the each color of the each pixel in one line. When the cover sensor 27 is ON, the CPU 30 stores a value "1" as the cover state flag CFG in association with the first white data WH1 in the RAM 32. When the cover sensor 27 is OFF, the CPU 30 stores a value "0" as the cover state flag CFG in association with the first white data WH1 in the RAM 32.

In RA5 the CPU 30 moves the reading section 20 by using the drive circuit 37 and acquires the second white data WH2 of the reading section 20 as the reference data. Specifically, the CPU 30 transmits a drive instruction to the drive circuit 37 for moving the reading section 20 so that the reading position of the reading section 20 matches a position shifted in downstream side in the sub scanning direction from the home position HP by 3 mm. The CPU 30 controls the light source 21 to turn on so as to emit light of each color at the corresponding intensity ST adjusted in RA2, and controls the reading section 20 to read the reference member BM. The CPU 30 acquires a set of read digital image data for each color of each pixel in one line as a set of second white data WH2 of the each color of the each pixel in one line. When the cover sensor 27 is ON, the CPU 30 stores a value "1" as the cover state flag CFG in association with the second white data WH2 in the RAM 32. When the cover sensor 27 is OFF, the CPU 30 stores a value "0" as the cover state flag CFG in association with the second white data WH2 in the RAM 32.

In RA6 the CPU 30 acquires the second black data BK2 of the reading section 20 as the reference data. Specifically, the CPU 30 controls the light source 21 to turn off and controls the reading section 20 to read the reference member BM. The CPU 30 acquires a set of read digital image data for one color of each pixel in one line as the second black data BK2 of the one color of the each pixel in one line. When the cover sensor 27 is ON, the CPU 30 stores a value "1" as the cover state flag CFG in association with the second black data BK2 in the RAM 32. When the cover sensor 27 is OFF, the CPU 30 stores a value "0" as the cover state flag CFG in association with the second black data BK2 in the RAM 32.

In RA7 the CPU 30 calculates the first white black difference data WBD1. Specifically, the CPU 30 calculates a first black average BA1 by averaging the sets of first black data BK1 for each pixel in one line. The CPU 30 calculates a second black average BA2 by averaging the sets of second black data BK2 for each pixel in one line. The CPU 30 calculates a black average difference BAD by subtracting the first black average BA1 from the second black average BA2.

When the black average difference BAD is smaller than a threshold value TH1, the CPU 30 generates third white data WH3 based on the first white data WH1 and the second white data WH2, and calculates the first white black difference data WBD1 by subtracting, from each set of third white data WH3, a corresponding set of second black data BK2.

When the black average difference BAD is larger than or equal to the threshold value TH1, the CPU 30 calculates second white black difference data WBD2 by subtracting from, each set of first white data WH1, a corresponding first black data BK1. The CPU 30 calculates a third white black difference WBD3 by subtracting, from each set of white data WH2, a corresponding set of second black data BK2. The CPU 30 generates the first white black difference data WBD1 based on the second white black difference data WBD2 and the third white black difference WBD3.

The CPU 30 starts counting the elapsed time ET from a value "0" and stores the first white black difference data WBD1 as the final white black difference data RWBD in the flash ROM 33.

In RA8 the CPU 30 moves the reading section 20 to the detection position DP by using the drive circuit 37. Specifically, the CPU 30 transmits a drive instruction to the drive circuit 37 for moving the reading section 20 so that the reading position of the reading section 20 matches the detection position DP.

Document Size Determination Process R5

Figure 6:
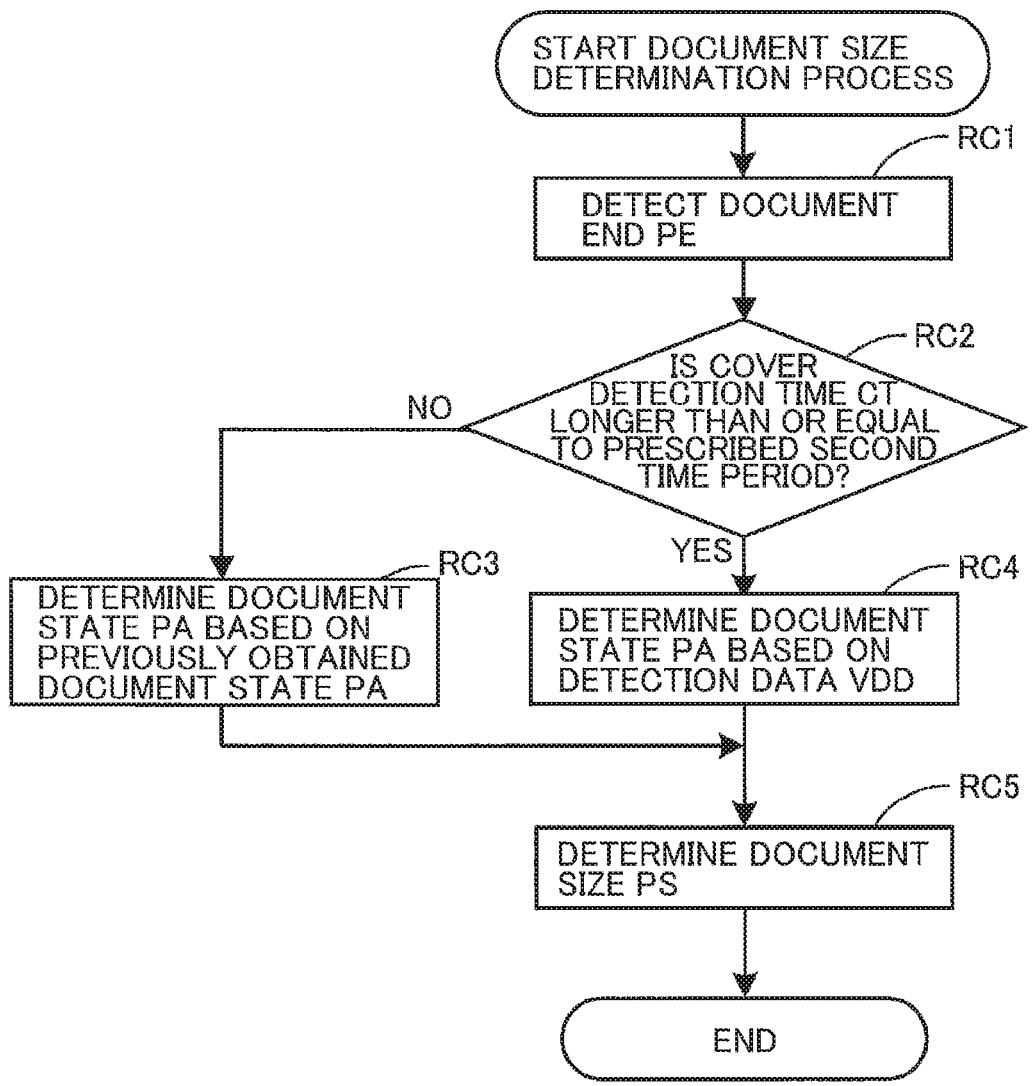
FIG. 6 is a flowchart illustrating a document size determination process.

When the document size determination process (R5) is started, in RC1 of FIG. 6 the CPU 30 detects the document end PE. Specifically, the CPU 30 sets the image processor 36 by using data obtained by subtracting the first black data BK1 from the first white data WH1. Further, the CPU 30 sets the image processor 36 by using the first black data BK1 as the black correction data and using a setting value indicating that each of the image processes is performed. In a state where the reading section 20 is positioned at the detection position DP, the CPU 30 controls the reading section 20 to turn on at the corresponding intensity ST of light of each color adjusted in RA2 and to read an image on the document sheet. The CPU 30 detects a position of a first pixel having color other than black in an order from the last pixel (a pixel corresponding to a downstream end position in the main scanning direction) to the top pixel (a pixel corresponding to an upstream end position in the main scanning direction) in the read image data. The CPU 30 stores the detected position as the document end PE in the RAM 32.

In RC2 the CPU 30 determines whether the cover detection time CT is longer than or equal to a prescribed second time period. Specifically, when the cover detection time CT is longer than or equal to the prescribed second time period (RC2: YES), the CPU 30 proceeds to RC4. When the cover detection time CT is shorter than the prescribed second time period (RC2: NO), the CPU 30 proceeds to RC3. In the embodiment, the prescribed second time period is 750 ms during which 16 number of sets of detection data VDD can be detected.

When the cover detection time CT is shorter than the prescribed second time period (RC2: NO), in RC3 the CPU 30 stores in the RAM 32 the document state PA that has been already stored in the RAM 32 as a new document state PA. That is, the new document state PA indicates the same state of the document state PA before RC3 is performed. When the RAM 32 does not stores the document state PA, the CPU 30 stores data indicating absence of the document sheet as the document state PA in the RAM 32. The CPU 30 proceeds to RC3 after completing RC5. There is a possibility that the document sheet cannot be placed on the platen DT within a time period shorter than 750 ms. In a conceivable case where the document state PA is updated on the basis of the sets of detection data VDD even if the cover detection time CT is shorter than 750 ms, there would be a possibility that the document state PA is incorrectly determined by misdetection of the cover CV as the document sheet, for example. In the embodiment, when the cover detection time CT is shorter than the 750 ms (the prescribed second time period) (RC2: NO), the document state PA is not changed essentially, thereby preventing incorrect determination of the document state PA.

When the cover detection time CT is longer than or equal to the prescribed second time period (RC2: YES), in RC4 the CPU 30 determines the document state PA based on the sets of detection data VDD. Specifically, when all the 16 number of sets of detection data VDD indicate presence of the document sheet, the CPU 30 stores data indicating presence of the document sheet as the document state PA in the RAM 32. When at least one of the 16 number of sets of detection data VDD indicates absence of the document sheet, the CPU 30 stores data indicating absence of the document sheet as the document state PA in the RAM 32.

Here, the fastest case and a slowest case are explained while referring to FIG. 8. The fastest case is a case where the cover CV is closed as quick as possible. The slowest case is a case where the cover CV is closed as slow as possible. The full open position CFP indicates a state where the cover CV full opens. A complete closed position CCP indicates a state where the cover CV is completely closed. In the embodiment, the document detection sensor 28 erroneously detects presence of the document sheet if the document sheet is actually present on the detection region SR when an angle between the cover CV and the platen DT is smaller than or equal to 8.65°, that is, the cover CV is positioned between the cover detection start position CDP and the complete closed position CCP. The cover sensor 27 detects that the cover CV is in the closed state when an angle between the cover CV and the platen DT is smaller than or equal to 3°, that is, the cover CV is positioned between the sensor detection position SDP and the complete closed position CCP.

FIG. 8 shows states of the cover CV and elapsed times between states in the fastest case. In the fastest case, the user closes the cover CV from the full open position CFP to the complete closed position CCP in 0.3 seconds. The document detection sensor 28 erroneously detects (or outputs) a set of detection data VDD in a period of 34 ms in which the cover CV moves from the cover detection start position CDP to the sensor detection position SDP. The detection interval TI is 50 ms in the embodiment. When the document detection sensor 28 detects the cover CV in the period of 34 ms, the detected result in the period of 34 (that is, data on the basis of detection of the cover CV) is stored as a latest set of detection data VDD among the 16 sets of detection data VDD in the RAM 32. In this case, a second latest set of detection data VDD among the 16 number sets of detection data VDD in the RAM 32 is detected in a document absence detection region DADR shown in FIG. 8. Here, the document absence detection region DADR is a time region where the document detection sensor 28 can correctly detect absence of the document sheet. The detection interval TI may be shorter than the document absence detection region DADR in order to surely detect the absence of the document sheet. The document absence detection region DADR corresponds to a time period before timing when the cover CV is at the cover detection start position CDP. When the document detection sensor 28 does not detect (or output) the set of detection data VDD in the period of 34 ms, a latest set of detection data VDD among the 16 number of sets of detection data VDD in the RAM 32 is detected in the document absence detection region DADR. Accordingly, when the document detection sensor 28 obtains the sets of detection data VDD in a case where the document sheet is not placed on the platen DT, the latest set of detection data VDD or the second latest set of detection data VDD is data detected in the document absence detection region DADR. The data that is detected in the document absence detection region DADR is not affected by the ambient light, and is obtained without misdetection of the cover CV as the document sheet, thereby detecting absence of the document sheet as the document state PA. On the other hand, the sets of detection data VDD is obtained when the document sheet is positioned at the detection region SR, the document detection sensor 28 detects presence of the document sheet when the cover CV moves between the full open position CFP and the sensor detection position SDP. A set of detection data VDD acquired when the cover CV is at the full open position CFP indicates presence of document sheet. This is because about 1 second is required for starting closing the cover CV from a timing when the user places the document sheet on the platen DT.

FIG. 8 also shows states of the cover CV and elapsed times between states in the slowest case. In the slowest case shown in FIG. 8, the user closes the cover CV from the full open position CFP to the complete closed position CCP in 5 seconds. The document detection sensor 28 erroneously detects the cover CV as the document sheet in a period of 565 ms in which the cover CV moves from the cover detection start position CDP to the sensor detection position SDP. Here, the detection interval TI is 50 ms in the embodiment. When the document detection sensor 28 detects (or outputs) 12 number of sets of detection data VDD in the period of 565 ms, a thirteenth latest set of detection data VDD among the 16 number of sets of detection data VDD in the RAM 32 is detected in the document absence detection region DADR shown in FIG. 8. When the document detection sensor 28 detects (or output) 11 number of sets of detection data VDD in the period of 565 ms, a twelfth latest set of detection data VDD among the 16 number of sets of detection data VDD in the RAM 32 is detected in the document absence detection region DADR. Accordingly, when the document detection sensor 28 obtains the sets of detection data VDD in a case where the document sheet is not placed on the platen DT, the twelfth latest set of detection data VDD or the thirteenth latest set of detection data VDD is data detected in the document absence detection region DADR. The data that is detected in the document absence detection region DADR is not affected by the ambient light, and is obtained without misdetection of the cover CV as the document sheet, thereby detecting absence of the document sheet as the document state PA. On the other hand, the sets of detection data VDD is obtained when the document sheet is positioned at the detection region SR, the document detection sensor 28 detects presence of the document sheet when the cover CV moves between the full open position CFP and the sensor detection position SDP. As described above, the document state PA is correctly determined in both the fastest case and the slowest case.

After completing RC3 or RC4, in RC5 the CPU 30 finally determines the document size PS. Specifically, the CPU 30 sets a main scanning directional length of the document sheet as a distance from the reference point BP to the document end PE. The CPU 30 sets a sub scanning directional length of the document sheet in the sub scanning direction smaller than a longitudinal length of the A4 document sheet when the document state PA indicates absence of the document sheet. The CPU 30 sets the sub scanning directional length of the document sheet in the sub scanning direction longer than or equal to the longitudinal length of the A4 document sheet when the document state PA indicates presence of the document sheet. The CPU 30 make settings of the image processor 36 by a setting value indicating that none of the image processes is performed. After completing RC5, the document size determination process R5 is finished.

Advantages

In the embodiment, through the processes RE1-RE5, data indicating presence or absence of the document sheet outputted from the document detection sensor 28 is acquired as a set of detection data VDD every 50 ms of the detection interval TI. Accordingly, the RAM 32 stores the latest 16 number of sets of detection data VDD at a timing when the cover CV is closed. In the document size detection process, in RC1 the reading section 20 reads an image on the document sheet when the reading section 20 is at the detection position DP. The document end PE is detected as a position of a first particular pixel having color other than black in an order from the last pixel to the first pixel. In RC4 presence of document sheet is determined as the document state PA when all the 16 number of sets of detection data VDD indicate presence of the document sheet. On the other hand, in RC4 absence of document sheet is determined as the document state PA when at least one set of detection data VDD indicates absence of the document sheet. In RC5 the main scanning directional length and the sub scanning directional length are determined as the document size PS. Accordingly, the document size PS can be determined on the basis of the document end PE detected by the reading section 20 and the sets of detection data VDD detected by the document detection sensor 28.

Correspondence

The image reader SM, the cover CV are examples of an image reader and a cover. The reading section 20, the AFE 35, the conveyance motor MT, and the moving mechanism MM are examples of a image reading section. The document detection sensor 28, the cover sensor 27, and the CPU 30 are examples of a document detector, a detector, and a processor, respectively. The RAM 32, and the flash ROM 33 are examples of a memory. The processes RE1-RE5 in the document detection process is an example of a storing process. The process RC1 in the document size determination process (R5) is a main scanning directional length detection process. The process RC4 is an example of a sub scanning directional length detection process. The process RC5 is an example of a reading range determination process.

Variations

While the disclosure has been described in detail with reference to the above embodiments, it would be apparent to those skilled in the art that various changes and modifications may be made thereto.

(1) The image reader SM may be a multifunctional peripheral having a printing section. Further, in the embodiment, only the single reading section 20 is provided in the image reader SM. However, a plurality of reading sections 20 may be provided in the image reader SM.

(2) The CPU 30 performs of the entire main reading process shown in FIG. 4. However, the configuration is not limited to this. For example, the image processor 36, the device controller 34, or the AFE 35 may perform a part of R2-R14 of the main reading process.

(3) In the embodiment, a set of detection data VDD is obtained every 50 ms as the detection interval TI, thereby acquiring the 16 number of sets of detection data VDD. However, the detection interval TI and the number of sets of detection data VDD are not limited to this. For example, the detection interval TI may be any time shorter than 50 ms, or the number of sets of detection data VDD may be larger than 16.

(4) In the embodiment, when at least one set of detection data VDD indicates absence of the document sheet, the document state PA is determined to absence of the document sheet. However, other method may be employed. For example, the set of detection data VDD is easy to erroneously indicate presence of the document sheet when the cover CV is positioned near the closed state. The detection data VDD is easy to erroneously indicate absence of the document sheet when the cover CV is positioned apart from the closed state. Accordingly, a set of detection data VDD based on a result of detection when the cover CV is positioned near the closed state may be obtained so that the set of detection data VDD is hard to indicate the presence of the document sheet. And a set of detection data VDD based on a result of detection when the cover CV is positioned apart from the closed state may be obtained so that the set of detection data VDD is hard to indicate absence of the document sheet.

(5) In the embodiment, the closed state is detected so that the cover CV is at a most suitable position for the reading unit 20. The closed state may be detected so that the cover CV is at a most suitable position for the document detection sensor 28.

(6) In the embodiment, the reading section 20 is a contact type image sensor. However, the reading section 20 may be an image sensor in an optical reduction system.

(7) In the embodiment, the second length (optical length of the document detection sensor 28) is longer than the first length (optical length of the reading section 20). However, the first length may be longer than the second length.

What is claimed is:

1. An image reader comprising:
   a reading section having a platen, a light source, and a light receiver, the light receiver including a plurality of light receiving elements arranged in a line extending in a main scanning direction, each of the plurality of light receiving elements corresponding to a pixel, the reading section being configured to move in a sub scanning direction orthogonal to the main scanning direction to read a document placed on the platen on a line-to-line basis, the platen having a reference point at which a vertex of a document sheet is positioned;
   a document detector located at a first detection position separated from the reference point in the sub scanning direction by a prescribed distance, the document detector being configured to detect absence or presence of the document sheet;
   a cover configured to change between a closed state in which the cover covers the reading section and an open state in which the cover does not cover the reading section;
   a detector configured to detect whether the cover is in the closed state and the open state;
   a memory; and
   a controller configured to:
   a) control, during a period from a timing when the detector detects the open state to a timing when the detector detects the closed state, the document detector to detect whether the document sheet is present or absent every time a prescribed time period is elapsed, and store in the memory each set of first data indicating absence or presence of the document sheet on a basis of the detected result of the document detector;
   b) determine a first size of the document sheet in the main scanning direction by controlling the reading section to read a partial image of the document sheet when the detector detects change in state from the open state to the closed state;
   c) determine a second size of the document sheet in the sub scanning direction on a basis of the sets of first data when the detector detects change in state from the open state to the closed state; and
   d) determine a reading range on a basis of the first size and the second size, the reading section being configured to read the determined reading range on the line-to-line basis to obtain an image of the document sheet while moving in the sub scanning direction.

2. The image reader according to claim 1, wherein the control a) stores prescribed number of sets of first data in the memory, each of the prescribed number of sets of first data being obtained each time the prescribed time period is elapsed until the detector detects the closed state,
   wherein the determine c) determines the second size shorter than the prescribed distance when at least one of the prescribed number of sets of first data indicates absence of the document sheet.

3. The image reader according to claim 1, wherein the detector is configured to detect the open state when an angle between the cover and the platen is larger than a prescribed angle, and detect the closed state when the angle between the cover and the platen is smaller than or equal to the prescribed angle,
   wherein the angle is determined so that the document detector is configured to detect presence of the document sheet by detecting the cover without being influenced by ambient light entering the reading section when the angle is smaller than or equal to the prescribed angle.

4. The image reader according to claim 1, wherein the reading section includes a contact type image sensor,
   wherein the document detector is located inside of the platen,
   wherein a first optical length is longer than a second optical length, where the first optical length is a sum of an optical length from the document detector to a second detection position and an optical length from the second detection position to the document detector, the second detection position being a position in the document sheet which the document detector detects, where the second optical length is a sum of an optical length from the light source positioned when the determine b) is performed to a third detection position and an optical length from the third detection position to the reading section positioned when the determine b) is performed, the third detection position being a position in the document sheet detected in the determine b).

5. An image reader comprising:
   a reading section having a platen, a light source, and a light receiver, the light receiver including a plurality of light receiving elements arranged in a line extending in a main scanning direction, the reading section being configured to move in a sub scanning direction orthogonal to the main scanning direction to read a document placed on the platen on a line-to-line basis, the platen having a reference point;
   a document detector located at a first detection position separated from the reference point in the sub scanning direction by a prescribed distance;
   a cover movable between a closed state and an open state;
   a cover detector configured to detect whether the cover is in the closed state or the open state;
   a memory; and
   a controller configured to:
   a) obtain an output from the document detector every particular time period until the cover detector detects the closed state since the cover detector detects the open state;

b) store in the memory each set of first data representing the output from the document detector, each set of first data indicating absence or presence of the document sheet;
c) when the cover detector detects the closed state since the cover detector detects the open state, control the reading section to read a partial range of the document sheet;
d) obtain partial image data on a basis of output from the reading section while reading the partial image;
e) determine a first size of the document sheet in the main scanning direction on a basis of the partial image data;
f) determine a second size of the document sheet in the sub scanning direction on a basis of the sets of first data when the cover detector detects the closed state since the cover detector detects the open state;
g) determine a reading range on a basis of the first size and the second size;
h) control the reading section to read the determined reading range on the line-to-line basis; and
i) obtain image data on a basis of output from the reading section while reading the determined reading range.

\* \* \* \* \*